(12) United States Patent
McKean et al.

(10) Patent No.: US 6,438,648 B1
(45) Date of Patent: Aug. 20, 2002

(54) SYSTEM APPARATUS AND METHOD FOR MANAGING MULTIPLE HOST COMPUTER OPERATING REQUIREMENTS IN A DATA STORAGE SYSTEM

(75) Inventors: Brian Dennis McKean, Longmont; John Edward Archibald, Jr., Boulder, both of CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/470,257

(22) Filed: Dec. 22, 1999

(51) Int. Cl.[7] .............................................. G06F 12/00
(52) U.S. Cl. ........................... 711/114; 711/170; 710/36
(58) Field of Search ................................ 711/113, 114, 711/166, 170; 710/74, 36, 19, 4; 714/7, 6

(56) References Cited

U.S. PATENT DOCUMENTS

| | | | | |
|---|---|---|---|---|
| 5,437,022 A | * | 7/1995 | Beardsley et al. | 714/6 |
| 5,530,829 A | * | 6/1996 | Beardsley et al. | 711/113 |
| 5,717,949 A | * | 2/1998 | Ito | 710/4 |
| 5,809,224 A | * | 9/1998 | Schultz et al. | 714/7 |
| 5,812,754 A | * | 9/1998 | Lui et al. | 714/6 |
| 5,822,782 A | * | 10/1998 | Humlicek et al. | 711/170 |
| 5,829,048 A | * | 10/1998 | Ofer et al. | 711/166 |
| 5,867,736 A | * | 2/1999 | Jantz | 710/74 |
| 5,953,689 A | * | 9/1999 | Hale et al. | 702/186 |
| 5,978,856 A | * | 11/1999 | Jones | 711/114 |
| 5,996,030 A | * | 11/1999 | Ofer | 710/19 |
| 6,141,707 A | * | 10/2000 | Halligan et al. | 710/36 |

* cited by examiner

Primary Examiner—David Hudspeth
Assistant Examiner—Fred F. Tzeng
(74) Attorney, Agent, or Firm—Dorsey & Whitney LLP; R. Michael Ananian (57) ABSTRACT

Whenever a controller receives a message that includes a particular target ID and a particular computer's operating requirements with respect to the operation of the plurality of logical units mapped across a plurality of disk storage devices, the controller stores one set of the particular computer's operating requirements per target ID per logical unit. Each host computer in a data storage system that has substantially similar operating requirements uses the same target ID in any I/O requests to a controller. Subsequently, whenever the controller processes an I/O request from any computer that uses the particular target ID, the controller will use the particular set of the operating requirements to configure the operation of each of the logical units.

23 Claims, 5 Drawing Sheets

SYSTEM APPARATUS AND METHOD FOR MANAGING MULTIPLE HOST COMPUTER OPERATING REQUIREMENTS IN A DATA STORAGE SYSTEM

FIELD OF THE INVENTION

The present invention relates generally to data storage systems. More particularly, the present invention relates to a system, structure, and method for managing multiple sets of different host computer operating requirements by a disk drive array controller.

BACKGROUND OF THE INVENTION

Disk drives in all computer systems are susceptible to failures caused by temperature variations, head crashes, motor failure, controller failure, and changing voltage conditions. Modern computer systems require, or at least benefit from, a fault-tolerant data storage system, for protecting data in the data storage system against instances of disk drive failure. One approach to meeting this need is to provide a redundant array of independent disks (RAID) system operated by a disk array controller (controller).

Figure 1:
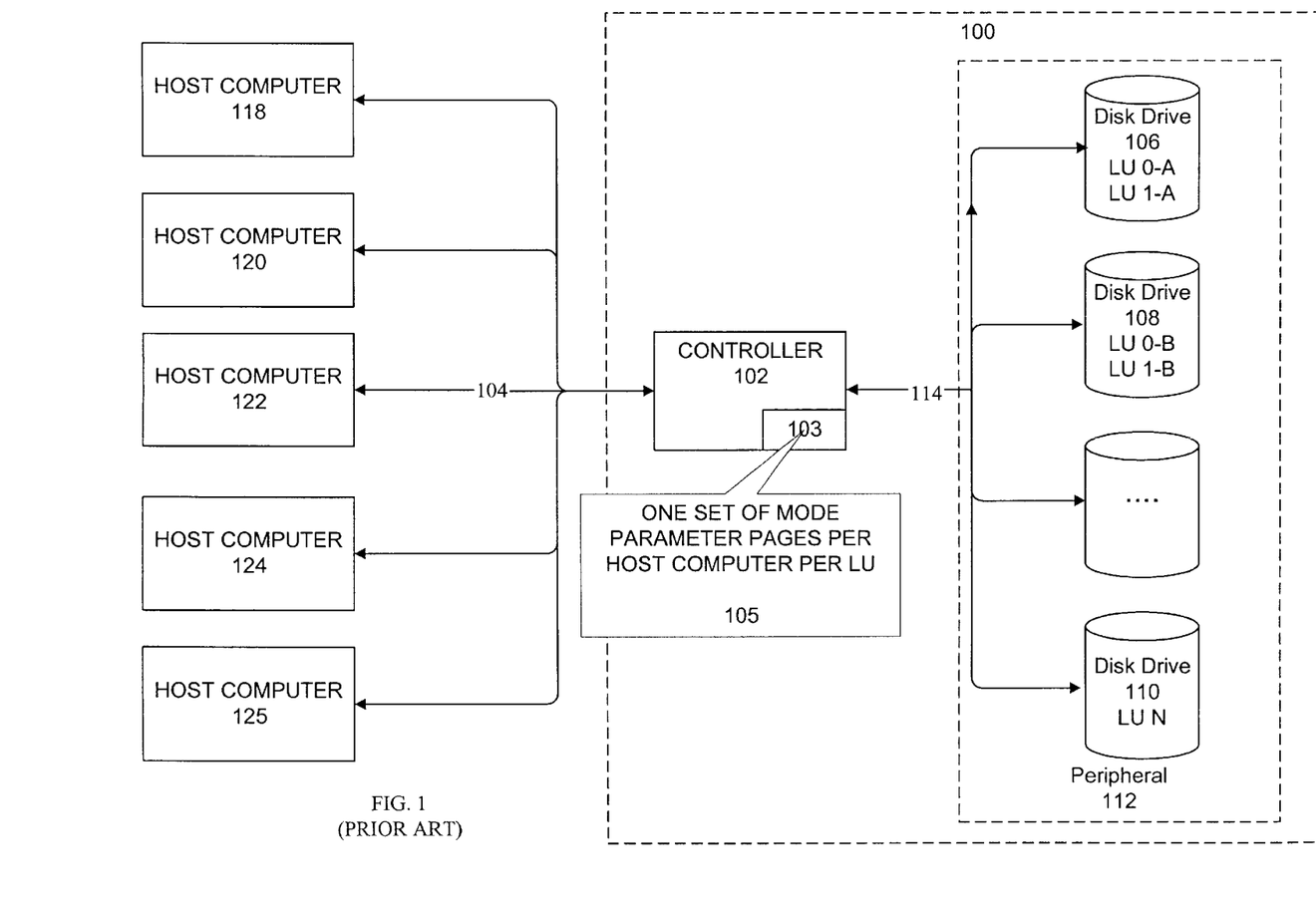
FIG. 1 is a block diagram illustrating aspects of a data storage system, according to the state of the art.

Referring to FIG. 1, there is shown a block diagram illustrating aspects of a data storage system 100 configured as a RAID, according to the state of the art. The data storage system 100 includes controller 102 coupled across I/O bus 104 to one or more host computers 118–125. The controller 102 is also coupled across I/O bus 114 to a rack of disk drives 106–110. I/O bus 104 and I/O bus 114 can each respectively be one of several different types of I/O buses, including, for example, a parallel SCSI bus, an FC-AL bus, a Fibre Channel Fabric bus, a USB bus, or an IEEE 1394 bus.

The controller 102 coordinates the disk drives 106–110 so they appear to host computers 118–125 as a single logical drive, but can take advantage of the multiple physical drives 106–110 by storing data redundantly across the disk drives 106–110, thus protecting against data loss from any single disk drive 106–110. A logical unit ("LU") is the medium used by controller 102 to store and retrieve data respectively to and from the disk drives 106–110. (LUs and are known in the art).

A controller 102 typically maps from eight (8) to one-hundred-and-twenty-eight (128) LUs across each of the disk drives 106–110. (Procedures to perform such mapping are known in the art.) For example, LUs 0-X and 1-X are mapped across disk drives 106–108, illustrated respectively as LU 0-A, LU 1-A, LU 0-B, and LU 1-B, and the like.

Controller 102 processes I/O requests from host computers 118–125. Such I/O requests include, for example, Small Computer System Interface (SCSI) I/O requests, which are known in the art of computer programming. Host computers 118–125 typically execute one or more computer programs (individual computer programs are not shown) that have particular requirements with respect to the operational behavior of the LUs 0-N in response to processing such I/O requests.

For example, consider that host computer 118 is used to execute a video playback computer program (not shown), and that host computer 120 is used to execute a video capture computer program (not shown). The video playback application (host computer 118) requires a timely response from each respective disk drive 106–110 to every read data request (for example, a SCSI read data request) that it sends to controller 102, such that a playback operation of a video image (not shown) by the video playback application is not interrupted by a slow return of the requested data from any respective disk drive 106–110.

In contrast, the video capture application (host computer 120) does not require a timely response from each respective disk drive 106–110 to every I/O request that it sends to controller 102. However, the video capture application does require each respective disk drive 106–110 to implement error recovery information to ensure that the video data that is written to each respective disk drive 106–110 by the video capture application is stored with no errors. Such error recovery information is known in the art of computer programming.

If each disk drive 106–110 were to be configured to implement such error recovery information to the benefit of computer's 118 video playback application, a write data request sent by the computer's 118 video capture application may result in insufficient amounts of error recovery information being written to disk drives 106–110. Analogously, if each disk drive 106–110 were to be configured to implement such error recovery information to the benefit of computer's 120 video capture application, a read data request sent by the computer's 120 video playback application may incur unacceptable delays reading data from disk drive 106–110. Therefore, it is evident that host computers 118 and 120 have different operating requirements with respect to the operational behavior of the LUs 0-N in response to processing such I/O requests.

When a data storage system 100 includes a plurality of host computers 118–125 that have diverse operating requirements with respect to at least a subset of one another, the host computers 118–125 (and controller 102) are said to be operating in a heterogeneous host computer 118–125 operating environment. For a host computer 118–125 in such an environment to properly operate, it must be able to configure the operational behavior of the LUs 0-N to parallel the host computer's 118–125 particular requirements.

SCSI standards provide a procedure for a particular host computer 118–125 to specify its particular operating requirements with respect to the operation of each LU 0-N that is mapped across disk drives 106–110. This is typically accomplished through the use of the SCSI mode select command that includes one or more sets of mode parameter pages, wherein each mode parameter page identifies one or more of the particular host computer's 118–125 particular operating requirements. The use and format of the mode select command and mode parameter pages are known in the art of computer programming.

Because disk drives 106–112 are being operated as a RAID, the particular host computer 118–125 will send the mode select command to the controller 102, whereupon, while processing any I/O requests from the particular computer 118–125, the controller 102 configures LUs 0-N to operate in the appropriate manner. According to SCSI standards (see SCSI-2 document ANSI X3.331 (1994), section 8.2.8, and SCSI-3 document ANSI X3.301 (1997), section 7.8), in a heterogeneous host computer 118–125 operating environment, controller 102 will store and maintain in random access memory (RAM) 103 one set of mode parameter pages per host computer 118–125 per LU 0-N, as illustrated by callout 105.

In such a heterogeneous computer 118–125 operating environment, significant problems are presented by the use of conventional techniques to store mode parameter pages in a controller 102. One problem is that the amount of RAM 103 that a controller 102 may be required to use to store multiple sets of mode parameter pages may be excessive. This problem is a function of the number of host computers 118–125 and the number of LUs 0-N in a data storage system 100.

The number of host computers 118–125 in data storage system 100 can vary. For example: (a) if I/O bus 104 is a parallel SCSI bus, as many as 15 host computers 118–125 can be coupled to controller 102; (b) if I/O bus 104 is an FC-AL bus, as many as 128 host computers 118–125 can be coupled to controller 102; and, (c) if I/O bus 104 is a Fibre Channel Fabric bus, then over 16 million host computers 118–125 can be coupled to the controller 102. However, recall that a controller 102 typically maps from 8 to 128 LUs 0-N across disk drives 106–110.

In light of the above, the number of mode parameter pages that a controller 102 may need to store in RAM 103 can widely vary. If controller 102 were coupled to 128 host computers in a heterogeneous computer operating environment that includes 128 LUs 0-N, controller 102 will be required to store and maintain a staggering 16,128 sets of mode parameter pages in its RAM 103. (This number is derived by providing one set of mode parameter pages multiplied by the number of host computers (128 host computers) multiplied by the number of LUs (128 LUs)). In a worst case scenario, if controller 102 were coupled to 16 million in such an environment, having 128 LUs 0-N, controller 102 will be required to store and maintain a staggering 32,768,000,000 sets of mode parameter pages in its RAM 103.

Consider that a single set of mode parameter pages may contain from 0 bytes of data to 800 bytes of data, usually about 400 bytes of data. (Note: the size of mode pages varies from device to device but is constant for a particular device.) A controller 102 will require, on average, at least 6,451,200 bytes of RAM 103 to store 16,128 sets of mode parameter pages. It can be appreciated, that the amount of RAM 103 required of controller 102 to store associated mode parameter pages for 16 million such host computers 118–125 will be significantly greater. Therefore, storing, by controller 102 in RAM 103, one set of mode parameter pages per host computer 118–125 per LU 0-N, depending upon the configuration of the data storage system 100, may require excessive amounts of RAM 103.

An additional problem presented by conventional techniques of storing one set of mode parameter pages per LU 0-N per host computer 118–125 in a heterogeneous host computer 118–125 environment, is that while managing I/O requests from multiple host computers 118–125, controller 102 may need to refer to such mode parameter pages many times. This is a problem because management of so many mode parameter pages is time-consuming. An objective of modem computers is fast I/O request response times. Time-consuming mode parameter page management is counter to fast I/O request response times. Therefore, it is desirable to simplify mode parameter page management.

In light of the above, there is a need to overcome the limitations placed on a controller 102 by standard conventions for storing and managing multiple sets of mode parameter pages in a heterogeneous host computer 118–125 operating environment. What is needed is a system, apparatus and method for: (a) reducing the amount of RAM 103 that may be needed by a controller 102 to store multiple sets of mode parameter pages in such an environment; and (b) simplifying the management of multiple sets of mode parameter pages in such an environment.

BRIEF DESCRIPTION OF THE DRAWINGS

For a better understanding of the nature and objects of the invention, reference should be made to the following detailed description taken in conjunction with the accompanying drawings, in which.

SUMMARY OF THE INVENTION

Heretofore, the amount of RAM that may be required by a controller to store multiple sets of mode parameter pages in a heterogeneous host computer operating environment may be excessive. The present invention solves these limitations.

According to this aspect of the present invention, whenever a controller receives a message that includes a particular target ID and a particular computer's operating requirements with respect to the operation of a plurality of logical units, the controller stores one set of the particular computer's operating requirements per target ID per logical unit. Each host computer that has substantially similar operating requirements uses the same target ID in any I/O requests to a controller. Subsequently, whenever the controller processes an I/O request from any computer that uses the particular target ID, the controller will use the particular set of the operating requirements to configure the operation of each of the logical units. In this manner, the present invention may substantially reduce the number of sets of operating requirements that need to be stored into its RAM.

DETAILED DESCRIPTION OF EMBODIMENT OF THE INVENTION

The invention will now be described in detail by way of illustrations and examples for purposes of clarity and understanding. It will be readily apparent to those of ordinary skill in the art in light of the teachings of this invention that certain changes and modifications may be made thereto without departing from the spirit or scope of the appended claims.

Figure 2:
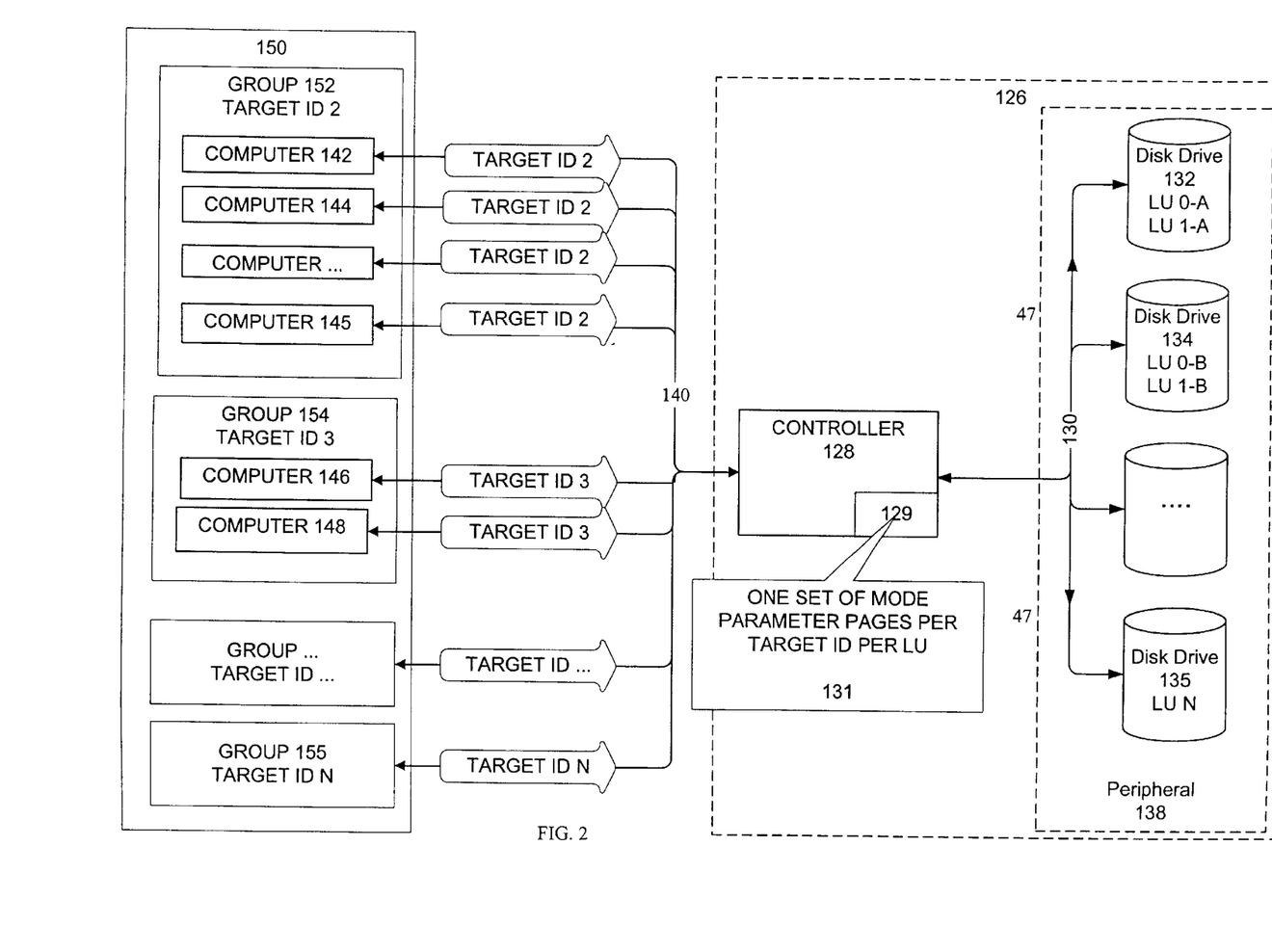
FIG. 2 is a block diagram illustrating aspects of an embodiment of a data storage system, according to one embodiment of the present invention.

Referring to FIG. 2, there is shown one embodiment of a data storage system 126 that is coupled to a heterogeneous host computer operating environment 150, according to one embodiment of the present invention. Data storage system 126 includes controller 128, which is coupled across I/O bus 130 to a plurality of disk drives 132–135 in peripheral 138. Other types of storage devices, such as, for example, optical disk drives and medium changer devices may also, or alternatively, be so configured.

Controller 128 is also coupled across I/O bus 140 to a plurality of host computers 142–148. Controller 128 manages I/O requests, such as, for example, SCSI read and write data requests, between host computers 142–148 and the plurality of LUs 0-N. Controller 128 is typically embodied as an external controller card in a separate storage subsystem as illustrated in FIG. 2, but may alternatively be embodied as a feature in a fibre channel fabric switch (not shown).

I/O bus 130 and I/O bus 140 can be any type of peripheral bus including but not limited to a SCSI bus, Universal Serial Bus (USB), Fibre Channel, Firewire (IEEE 1394), and the like.

Controller 128 includes RAM 129, wherein there is stored an operating requirements data structure 131, for storing one set of host computer 118–126 operating requirements per target ID 2-N per LU 0-N. (Operating requirements data structure 131 is discussed in greater detail below in reference to FIG. 4). According to the present invention, each host computer 142–148 that has substantially similar operating requirements will communicate with the controller 128 using the same target ID 2-N. Therefore, the system of the present invention may substantially reduce the amount of RAM 129 required to store the diverse operating requirements of host computers 142–148.

Figure 3:
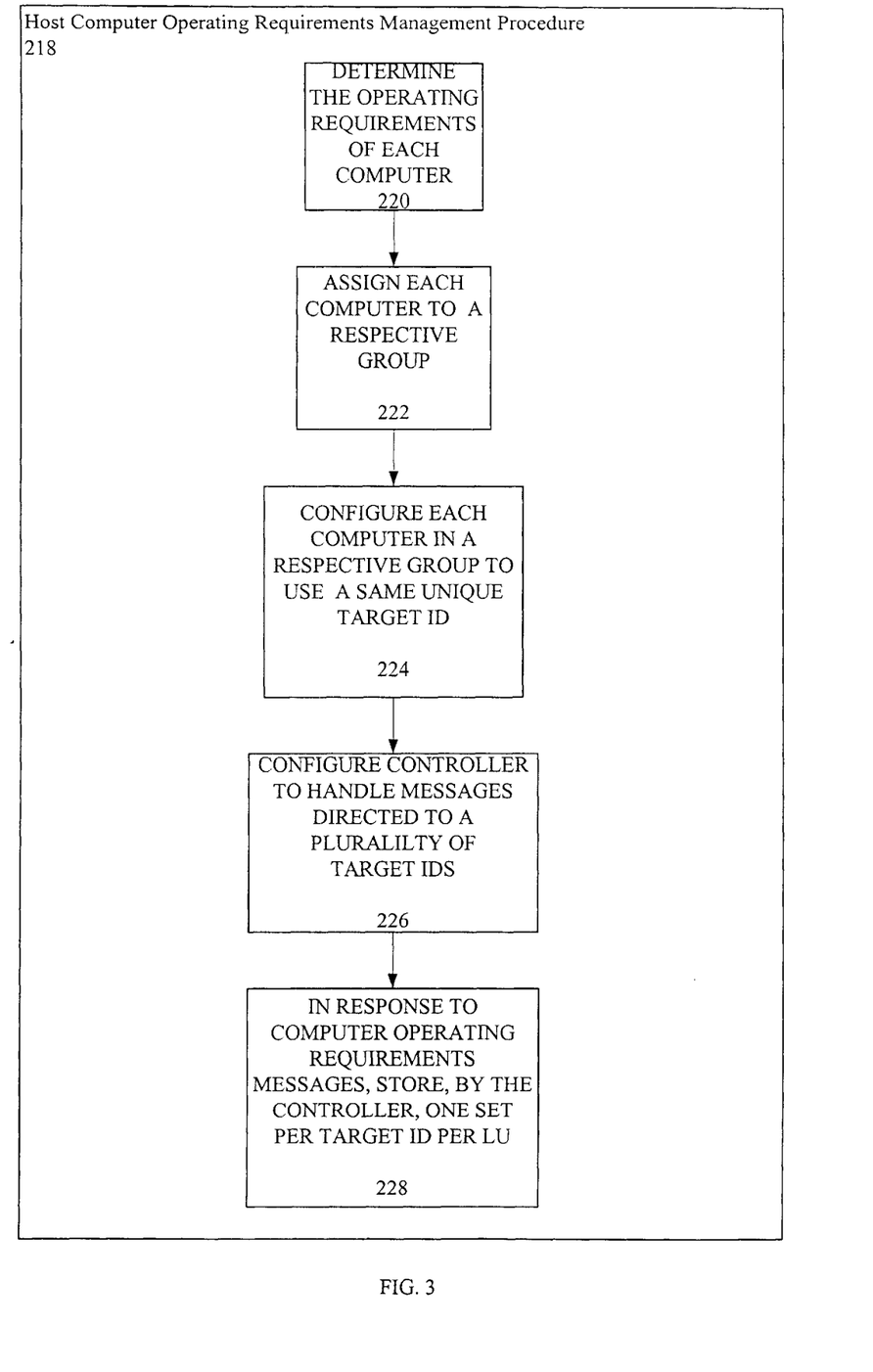
FIG. 3 is a flowchart illustrating aspects of an embodiment of a computer operating requirements management procedure, according to one embodiment of the present invention.

Referring to FIG. 3, there is shown a block diagram that illustrates aspects of an exemplary host computer operating requirements management procedure 218 ("management procedure 218"), according to one embodiment of the present invention. In a heterogeneous host computer operating environment 150 (see FIG. 2), management procedure 218 enables a controller 128 to store one set of host computer operating requirements per target ID 2-N per LU 0-N into RAM 129. In one embodiment, each set of host computer operating requirements is a set of SCSI mode parameter pages. As discussed in greater detail above, SCSI mode parameter pages are known in the art of computer programming.

Step 220 determines, by a human operator, the respective operating requirements of each host computer 142–148 with respect to the operation of disk drives 132–135. Such host computer 118–125 operating requirements are discussed in greater detail above, and include, for example, error recovery and data protection operating requirements.

Step 222 assigns, by a human operator, the host computers 142–148 (see FIG. 2) into groups 152–155. A computer 142–148 in a group 152–155 is determined to belong to a particular group 152–155 based on the computer's 142–148 particular operating requirements as compared to each of the other computer's 142–148 operating requirements. In particular, each host computer 142–148 in a particular group 152–155 is assigned to the group 152–155 based on the fact that the respective host computer 142–148 has: (a) substantially similar operating requirements with respect to any other host computer 142–148 in the particular group 152–155; and, (b) substantially different operating requirements with respect to any other host computer 142–148 in any other groups 152–155.

By substantially identical operating requirements, we mean that a computer's 142–148 particular operating requirements with respect to LUs 0-N, may be configured with identical values in another computer 142–148. Therefore, substantially identical in this context can really made that the particular operating requirements are identical and not necessarily all operating requirements are identical. By substantially different operating requirements, we mean that at least one operating requirement with respect to disk drives 132–135, must be different. Therefore, substantially different in this context can really mean that at least one operating requirement is different and not necessarily all operating requirements are different.

To illustrate the concept of a group 152–155, consider, for example, that host computers 142, 144, and 145 in group 152, have substantially identical operating requirements with respect to one another, and substantially different operating requirements with respect to the host computers in groups 154–155. Similarly, host computers 146–148 in group 154, have substantially identical operating requirements with respect to one another, and substantially different operating requirements with respect to the host computers in groups 152–155.

There can be any number of host computers 142–148 assigned to a particular group 152–155 (step 222). The number of host computers 142–148 in a group 152–155 is only by the substantially similar operating requirements rules discussed above, and the maximum number of host computers 142–148 in the system. (Limitations on the number of host computers 142–148 in a system are discussed in greater detail above). Step 224 configures, by an Administrator, each computer 142–148 in a respective group 152–155 to use a same unique target ID in any I/O request sent to controller 128 (see FIG. 2). (Such I/O requests include SCSI I/O read data and write data requests, which are known in the art of computer programming). To configure a computer 118–125 to use a particular target ID, the Administrator will use existing techniques for attaching a storage peripheral (controller 102 and disk drives 132–135) to a host computer 142–148. A group's 152–155 particular target ID 2-N is unique, even though each computer 142–148 in a respective group 152–155 uses the same unique target ID 2-N, because each computer 142–148 in a respective group 152–155 uses a different target ID 2-N as compared to any other computer 142–148 in any other group 152–155. To illustrate this, consider that respective I/O requests to controller 128, from host computers 142–148, are illustrated in FIG. 2 with hollow arrows, wherein the particular target ID 2-N that was assigned to the I/O request initiating computer 142–148 is indicated.

In this example, each computer 142–145 in group 152 uses the same target ID, target ID 2. Each computer 146–148 in group 154 uses the same target ID, target ID 3. Note that even though each computer 142–148 in a respective group 152–155 uses the same unique target ID, the particular target ID 2-N used by each computer in a group 152–155 is unique as compared to any other target ID 2-N used by any other computer 142–148 in any other group 152–155. The actual numerical value of each group's 152–155 assigned target ID 2-N (step 224) is not important, what is significant is that each respective group's 152–155 target ID 2-N value is unique as compared to each other respective group's 152–155 target ID 2-N value.

The number of target IDs 2-N available is limited by the total number of unique target IDs 2-N on an I/O bus 140. For a fibre channel fabric I/O bus 140, the maximum number of target IDs 2-N is over 16 million target IDs. If the I/O bus 140 is a parallel SCSI bus, the maximum number of target IDs 2-N is 16 target IDs 2-N. In one embodiment, each unique target ID 2-N is a unique SCSI ID. SCSI IDs and methods of assigning a unique SCSI ID to a computer 142–148 are known in the art of computer system administration.

In contrast to a conventional controller 102, which is typically configured to handle messages sent to only a single target ID 2-N, step 226 configures a controller 128 to handle messages from computers 142–148 sent to a plurality of target IDs 2-N, wherein each of the target IDs 2-N is one or more of the target IDs assigned to the computers 142–148 (step 224). Controller 128 can be configured to either process messages that include each of the target IDs 2-N assigned (step 224) to the computers 142–148, or can be configured to process messages that include only a subset of the target IDs 2-N assigned (step 224) to the computers 142–148. Such messages include, for example, SCSI mode select commands and SCSI I/O requests, both of which are known in the art of computer programming.

For example, controller 128 can be configured to process messages from: (a) each computer 142–145 that uses target ID 2 in group 152; (b) each computer 146–148 that uses target ID 3 in group 154, and the like. Or controller 128 can be configured to process messages from only those computers 142–145 in group 152 that use target ID 2, and another controller 128 can be configured to process messages from each computer 146–148 that uses target ID 3 in group 154, and the like. Any combination of controllers 128 can be used to process the messages from computers 142–148, as long there is a controller 128 to handle messages from each respective unique target ID 2-N.

In one embodiment, an Administrator configures the controller 128 to handle messages from computers 142–148 sent to the plurality of target IDs. The configuration could be through a controller 128 configuration computer program (not shown) that is executed on one or more of the host computers 142–148. Alternatively, the controller 128 configuration could be accomplished by using, for example, a touch panel with LCD display (not shown) that is located on the controller 128, or through an ethernet or serial port configuration interface on the controller 128. In this manner controller 128 can be configured to process messages from each of the host computers 142–148.

Step 228, in response to a message from a computer 142–148 that indicates the particular operating requirements of the computer 142–148 with respect to any of the disk drives 132–135, ensures that one set of the host computer's 142–148 particular operating requirements is represented in RAM 129 for each LU 0-N. In one embodiment, this is accomplished by ensuring that the group 152–155 that the computer 142–148 was assigned to (step 222) has an associated group information data structure 230-X stored in RAM 129. (Group information data structure 230-X is described in greater detail below in reference to FIG. 4). Because each computer 142–148 in a group 152–155 uses the same target ID 2-N, this can also be describes as ensuring that one set of such host computer operating requirements per target ID 2-N per LU 0-N is stored in RAM 129.

Figure 4:
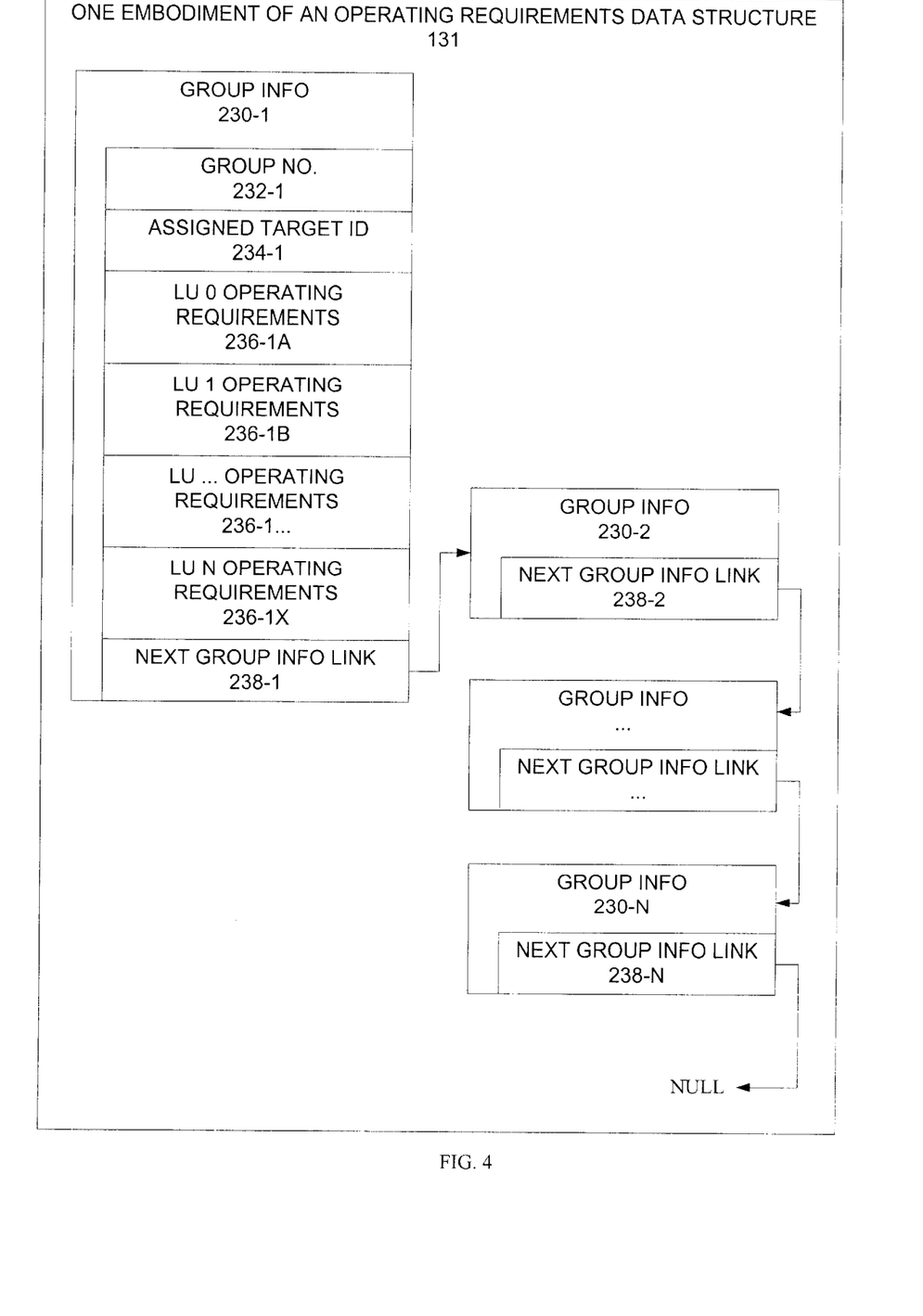
FIG. 4 is a block diagram illustrating aspects of an exemplary operating requirements data structure, according to one embodiment of the present invention; and, FIG. 5 is a block diagram illustrating aspects of a controller architecture, according to one embodiment of the present invention.

Referring to FIG. 4, there is shown a block diagram illustrating aspects of an embodiment of an operating requirements data structure 131, according to one embodiment of the present invention. Operating requirements data structure 131 can be implemented as any type of data structure 131, as long as each target ID has an associated set of mode parameter pages per LU 0-N.

In one embodiment, group info data structure 230-X includes the following elements:

Group No. 232-X indicates the group number that each host computer 118–125 in the particular group 152–155 belongs to. For example, computers 142–145 are illustrated as being associated with group 152, computers 146–148 are illustrated as being associated with group 154, and the like.

Assigned target ID 234-X is the target ID 2-N (see FIG. 2) that was assigned to the particular group 152–155. For example group 152 is associated with target ID 2, group 154 is associated with target ID 3, and the like.

Logical Unit ("LUN") operating requirements data structure 236-X ("LUN 236-X") contains the particular operating requirements associated with each of the computers 142–148 represented by the group info data structure 230-X. In one embodiment, each LUN 236-X is single set of SCSI mode parameter pages. (SCSI mode parameter pages are discussed in greater detail above).

Next Group Info Link 238-X is a reference to any other group info data structures 230-1. Thus, in one embodiment, operating requirements data structure 131 (see FIG. 2) is a linked list of group information ("info") 230-X data structures. (Linked list data structures and the operation of linked list data structures are known in the art of computer programming).

In a particular group info data structure 230-X, there is one such LU N 236-X for each LU N (see FIG. 2) in the peripheral 168. As noted above, a particular LU N 236-X in a particular group info data structure 230-X, includes substantially similar information with respect to each other LU N 236-X in the particular group info data structure 230-X. And, each LU N 236-X in a particular group info data structure 230-X, contains substantially different information with respect to each other LUN 236-X included in any other different group info data structure 230-X.

Figure 5:
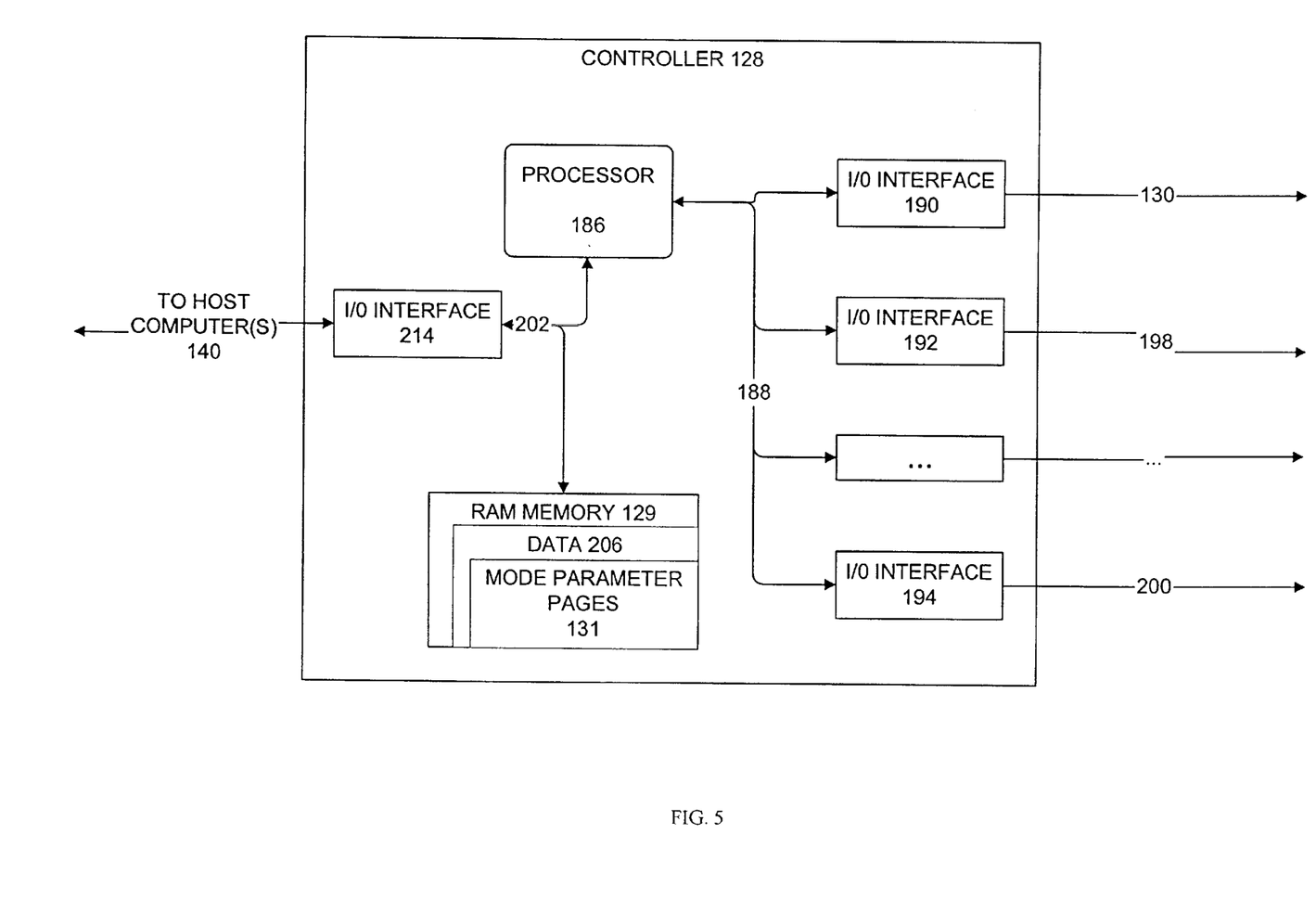

Referring to FIG. 5, there is shown a block diagram illustrating aspects of an exemplary controller 128, according to one embodiment of the present invention.

Controller 128 includes processor 186 which is coupled across first local bus 202 to I/O interface 214, for bridging between first local bus 202 and I/O 140, which is coupled to one or more host computers 142–148 (see FIG. 2). Processor 186 handles I/O requests from the host computers 142–148.

In one embodiment, according to one or more procedures that were discussed in greater detail above in reference to step 226 as illustrated in FIG. 3, I/O interface 214 is configured to respond to messages sent from one or more host computers 142–148 that specify one or more particular target IDs. In yet another embodiment, a plurality of I/O interfaces 214 are used by controller 128, wherein each respective I/O interface 214 will process messages associated with a particular target ID, as compared to other I/O interfaces 214 that process messages that specify other particular target IDs. Each of the multiple I/O interfaces 214 may also support multiple target IDs.

Processor 186 is also coupled across a second local bus 188 to one or more other I/O interfaces 190–194. Such other I/O interfaces 190–194 are known. I/O interfaces 190–194 respectively provide a bridge to a respective different I/O bus 130, I/O bus 130, 198–200. Each respective different I/O bus 130, 198–200 is coupled to a respective plurality of disk drives 132–135 (see FIG. 2). I/O buses 140, 130, 198–200 can be any type of I/O bus including but not limited to a SCSI bus, universal serial bus (USB), fiber channel, firewire (IEEE 1394), enterprise system connection (ESCON), and the like.

Processor 186 is operatively coupled across first local bus 202 to RAM 129, which may be either internal or external to controller 128. Processor 186 stores data into data 206, for example, one or more sets of SCSI mode parameter pages 208. SCSI mode parameter pages 208 includes, for example, one set of mode parameter pages per target ID per LU, as described in greater detail above.

In a preferred embodiment:(a) controller 128 is a DAC960 series RAID controller with firmware modifications made according to the structure and method of this disclosure, for storing one set of mode parameter pages per LU in a multiple heterogeneous host operating environment (DAC960 series RAID controllers are made by Mylex ™ of Fremont, Calif.); (b) processor 186 is a 32-bit Intel i960 RISC microprocessor with multitasking functionality; (c) RAM memory 129 is random access memory; (d) I/O buses 214,130,198, and 202 are fibre channel arbitrated loop or parallel SCSI; (e) first local bus 202 and second local bus 188 are PCI; (f) I/O interface 214 is fibre channel or parallel SCSI interface chip; and, (g) I/O interfaces 190,192 and 194 are fibre channel interface chips.

The system, method and apparatus of the present invention provide advantages over the state of the art by significantly reducing the number of sets of operating requirements 236-1X (see FIG. 4) that need to be stored by a controller 128 (see FIGS. 2 and 5). To illustrate these advantages, consider, for example, that group 152 includes three (3) computers 142–145, group 154 includes two (2) computers 146–148), and group 155 includes 10 computers (individual computers not shown). That is a total of 15 computers 142–148. According to the procedure of the present invention (see FIG. 3), a controller 128 will store only twelve (12) sets of operating requirements 236-1X into RAM 129. To arrive at this number of operating requirements 236-1X, three target IDs (target IDs IDs 2,3, and N) are multiplied by four LUs (LUs 0-N), to arrive at twelve sets of operating requirements 236-1X.

This is a significant benefit over conventional techniques, wherein for a similar number of computers 118–125 (see FIG. 1) in a heterogeneous host environment, a controller 102 would store sixty (60) sets of mode parameter pages into RAM 103. That is, fifteen (15) host computers 118–125 is multiplied by four LUs (LUs 0-N) to arrive at sixty (60) sets of mode parameter pages.

The benefits of the present invention are even more apparent when compared to the number of sets of mode parameter pages that a conventional controller 102 (see FIG. 1) would store if it were coupled to one-hundred-and-twenty-eight (128) host computers 118–125 in a heterogeneous host computer environment and 128 LUs. In such an environment, a conventional controller would store sixteen-thousand-one-hundred-and-twenty-eight (16,128) sets of mode parameter pages in its RAM memory (see FIG. 1). That is, 128 host computers 118–125, multiplied by 128 LUs (LUs 0-N), to arrive at 16,128 sets of mode parameter pages.

In contrast, according to the procedures of the present invention (see FIG. 3), if the 128 computers 142–148 (see FIG. 2) are determined to have, for example, two sets of distinct operating requirements with respect to disk drives 132–135 (see step 220), they are assigned into two groups 152–155 (step 222). Each host computer 142–148 in a group 152–155 has substantially similar operating requirements, and each group 152–155 is configured to use a unique target ID (step 224) in any messages to controller 128. Controller 128, after being configured to respond to each assigned target ID (step 224), will store only one-hundred-and-fifty-six (156) sets of operating requirements 236-1X into RAM 129.

This number of sets of operating requirements 236-1X is arrived at by multiplying two target IDs (one target ID for each of the two groups) multiplied by 128 LUs (LUs O-N), to arrive at 156 sets of operating requirements 236-1X. Therefore the present invention (where only 156 sets of operating requirements 236-1X are stored in RAM 129) is a significant advantage over the prior art (where 16,128 sets of host mode parameter pages were stored in RAM 103 for the same number of computers and LUs).

As can be appreciated from the foregoing examples, significantly reduces the amount information that is required to store each host computer's particular operating requirements. This significant reduction in the amount of information required, also reduces the amount of RAM 129 required to store such information. An additional benefit of the present invention is that any management, by a controller 128, of such a reduced number of sets of mode parameter pages 131 is considerably simplified, resulting in decreasing the amount of time that it will typically take to process an I/O request from a host computer 142–148, as compared to conventional I/O request processing times.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings.

For example, the present invention is applicable, not only to controllers 128 (see FIG. 2) that control I/O to an array of disk drives 118–125 according to a particular RAID level, but the present invention is also applicable to any data storage subsystem controller. Such a data storage subsystem controller does not necessarily process I/O requests in a RAID, according to any one particular RAID level. Rather, for example, such a data storage subsystem controller may process I/O requests to "just a bunch of disks"(JBOD) without any redundancy method.

In yet another example, the method described herein above is amenable for execution on various types of executable mediums other than a memory device such as a random access memory 129 (see FIG. 2). Other types of executable mediums can be used, such as but not limited to, a computer readable storage medium which can be any memory device, compact disc, or floppy disk.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

All publications and patent applications mentioned in this specification are herein incorporated by reference to the same extent as if each individual publication or patent application was specifically and individually indicated to be incorporated by reference.

We claim:

1. In a data storage system, a method for managing a plurality of host computer operating requirements with respect to the operation of a plurality of logical units mapped across a plurality of disk storage devices, the method comprising steps of:
   configuring each host computer that has substantially similar operating requirements with respect to the plurality of logical units to use the same target ID in any I/O requests to a controller;
   in response to receiving by the controller, a message that includes a particular target ID and a particular computer's operating requirements with respect to the operation of the plurality of logical units, storing, by the controller, one set of the particular computer's operating requirements per target ID per logical unit, such that whenever the controller processes an I/O request from any computer that uses the particular target ID, the controller uses the particular set of the operating requirements to configure the operation of each of the logical units.

2. The method of claim 1, wherein the message is a SCSI mode select command.

3. The method of claim 1, wherein the particular set of operating requirements are embodied in a set of SCSI mode parameter pages.

4. The method of claim 1, further comprising, before the step of receiving, steps of:
   for each of a plurality of host computers, determining each computer's operating requirements with respect to the operation of each of the plurality of disk storage devices;
   assigning each host computer to a group of a plurality of groups, wherein each host computer in a particular group has substantially similar operating requirements with respect to the operation of the disk storage devices, as compared to the operating requirements of each of the other computers in each of the other groups;

configuring each host computer in a group to use a same target ID of a plurality of target IDs in any messages to a controller, such that a groups particular target ID is unique as compared to each other target ID assigned to each of the other groups; and, setting up the controller to respond to any messages that specify one of at least a subset of the plurality of target IDs.

5. The method of claim 1, wherein the controller is a RAID controller.

6. The method of claim 1, wherein the controller is any data storage subsystem controller.

7. A data storage system for managing multiple host computer operating requirements with respect to the operation of a plurality of logical units that are mapped across a plurality of disk drives, the data storage system comprising:

a controller coupled to a memory, the controller also being coupled to a first bus and a second bus;

a plurality of host computers coupled to the first bus and organized into a plurality of host computer groups, each host computer in a particular host computer group having substantially similar operating requirements with respect to each other host computer in the particular host computer group, each host computer in a particular host computer group being assigned to use a same target ID, the same target ID being unique as compared to any other assigned target ID;

a plurality of disk storage devices coupled to the second bus, one or more disk storage devices associated with a redundancy group, each redundancy group being divided into the plurality of logical units;

the memory having an operating requirements data structure defined therein, the operating requirements data structure including a single set of computer operating requirements per same target ID per logical unit, each single set of computer operating requirements being associated with the substantially similar operating requirements of a respective group; and, the controller processing any I/O request from a computer by configuring the logical units in each redundancy group according to the single set of computer operating requirements per logical unit that is associated with the computer's same target ID.

8. The data storage system according to claim 7, wherein the single set of computer operating requirements are a single set of SCSI mode parameter pages.

9. The data storage system of claim 7, wherein the controller is a RAID controller.

10. The data storage system of claim 7, wherein the controller is any data storage subsystem controller.

11. The data storage system of claim 7, wherein each host computer in a particular group has substantially different operating requirements with respect to each other host computer in any other groups.

12. The data storage system of claim 7, wherein the operating requirements data structure includes a plurality of group information data structures, each respective group information data structure being associated with a particular group, each respective group information data structure including a single set of computer operating requirements per logical unit, the single set of computer operating requirements being associated with each host computer in the particular group.

13. In a data storage system, an apparatus for managing multiple host computer operating requirements with respect to a plurality of logical units, the apparatus comprising:

a memory having a data structure stored therein, the data structure including information to associate a single set of operating requirements per target ID per logical unit in a redundancy group, in response to a message from a computer having a target ID, the message including a set of the computer's particular operating requirements with respect to each logical unit, the processor storing into the data structure, one set of the computer's particular operating requirements per the target ID per logical unit, such that whenever the processor handles an I/O request from any computer that uses the target ID, the processor configures the operation of each of the logical units according to the particular set of operating requirements.

14. The apparatus of claim 13, wherein the single set of operating requirements is a single set of SCSI mode parameter pages.

15. The apparatus of claim 13, wherein the apparatus is a RAID controller.

16. The apparatus of claim 13, wherein the apparatus is any data storage subsystem controller.

17. The apparatus of claim 13, wherein the message is a SCSI mode select command.

18. The apparatus of claim 13, wherein the data structure is an operating requirements data structure that includes a plurality of group information data structures, each respective group information data structure being associated with a particular group of host computers, each respective group information data structure including a single set of computer operating requirements per LU, the single set of computer operating requirements being associated with each host computer in the particular group.

19. A computer program product for use in conjunction with a processor to manage multiple host computer operating requirements in a data storage system, the computer program product comprising a computer readable storage medium and a computer program mechanism embedded therein, the computer program mechanism comprising instructions for:

receiving a message that includes a particular target ID and a particular computer's operating requirements with respect to the operation of a plurality of logical units;

storing one set of the particular computer's operating requirements per a target ID per logical unit;

receiving an I/O request from any computer that uses the target ID; and, in response to receiving the I/O request, configuring the operation of each of the logical units according to the operating requirements that were stored per the target ID.

20. The computer program product of claim 19, wherein the message is a SCSI mode select command.

21. The computer program product of claim 19, wherein the particular set of operating requirements are embodied in a set of SCSI mode parameter pages.

22. The computer program product of claim 18, wherein the computer program product is in a memory of a RAID controller.

23. The computer program product of claim 19, wherein the computer program product is in a memory of a data storage subsystem controller.

* * * * *